W. KENNISH.
NURSING BOTTLES.
No. 183,808.            Patented Oct. 31, 1876.
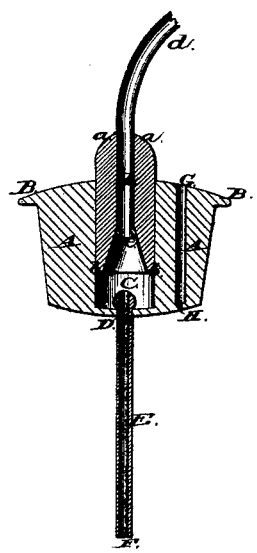
Witnesses:
W. F. Johnson
Chas. P. Pushaw
Inventor:
William Kennish

UNITED STATES PATENT OFFICE.

WILLIAM KENNISH, OF NEW BRUNSWICK, NEW JERSEY.

IMPROVEMENT IN NURSING-BOTTLES.

Specification forming part of Letters Patent No. 183,808, dated October 31, 1876; application filed October 17, 1876.

*To all whom it may concern:*

Be it known that I, WILLIAM KENNISH, of New Brunswick, in the county of Middlesex and State of New Jersey, have invented a new and useful Improvement in Nursing-Bottle Attachments, which improvement is fully set forth in the following specification, reference being had to the accompanying drawings.

My invention consists of an improved stopper for nursing-bottles, of which the accompanying drawing is a vertical section.

A A is a conical stopper, composed of india-rubber or other elastic substance. It is provided with a projecting rim for convenience in handling, and is penetrated by two cylindrical holes, which pass from the top nearly through the stopper, leaving a thin disk or diaphragm at the lower end. The diaphragm of the center hole or chamber C is for the purpose of suspending an inner tube of glass or other material, and allowing it to swing to all sides. This diaphragm has a hole in its center, D, through which the end of the inner tube is pressed, an enlargement at that end preventing it from falling out. The cylindrical hole or tube G is for the purpose of admitting air to the bottle. The disk at the bottom of the tube is penetrated by a capillary hole, which serves as a valve, expanding under pressure from without to a size sufficient to admit air, and contracting by its elastic property to its normal size, too small to permit the escape of milk. $a\ a$ is a plug of wood, or other suitable substance, through which is a cylindrical hole, terminating in a conical chamber, $b\ b$, as shown. $d\ d$ is a flexible tube drawn through the hole in the plug, an enlargement at its end, $e$, and the contracting form of the chamber $b\ b$, preventing the tube from being pulled out. The plug is then pressed into the chamber C, in the position shown in the section.

The passage for milk from the bottle is as follows: Suction having been exerted in the flexible tube $d\ d$, the milk is drawn through the tube at F into the chamber C, and thence into the tube $d$ at $e$. The passage for air into the bottle, to take the place of milk withdrawn, is through the cylindrical hole or tube G to the capillary hole in the diaphragm at its bottom, which enlarges under pressure from without, to admit as much air as is necessary.

I claim as my invention—

1. The nursing-bottle stopper A A, composed of india-rubber or other elastic material, molded with a central chamber, C, terminating in a thin film or bottom, which suspends and gives freedom of motion to an inner tube, as shown.

2. A plug or stopper, $a\ a$, of wood or other suitable substance, centrally perforated with a cylindrical hole, terminating in a conical chamber, $b\ b$, in combination with nursing-bottle stopper A A, central chamber C terminating in thin bottom and suspended tube, as described.

3. In combination with nursing-bottle stopper A A, central chamber C, plug $a\ a$, diaphragm D, and suspended inner tube F, a vent composed of a cylindrical hole, G, terminating in a hole of capillary size through a thin part of the stopper, as described.

WILLIAM KENNISH.

Witnesses:
W. T. JOHNSON,
CHAS. P. PUSHAW.